(12) United States Patent
Fan et al.

(10) Patent No.: US 10,210,241 B2
(45) Date of Patent: Feb. 19, 2019

(54) FULL TEXT INDEXING IN A DATABASE SYSTEM

(71) Applicant: INTERNATIONAL BUSINESS MACHINES CORPORATION, Armonk, NY (US)

(72) Inventors: Si Bin Fan, Beijing (CN); Peng Hui Jiang, Beijing (CN); Lin Sun, Beijing (CN); Yan Sun, Beijing (CN); Li Xiang, Beijing (CN); Yan Xu, Beijing (CN); Wen Yin, Beijing (CN)

(73) Assignee: International Business Machines Corporation, Armonk, NY (US)

(*) Notice: Subject to any disclaimer, the term of this patent is extended or adjusted under 35 U.S.C. 154(b) by 291 days.

(21) Appl. No.: 15/150,465

(22) Filed: May 10, 2016

(65) Prior Publication Data

US 2017/0329839 A1    Nov. 16, 2017

(51) Int. Cl.
*G06F 17/30*    (2006.01)

(52) U.S. Cl.
CPC .. *G06F 17/30616* (2013.01); *G06F 17/30011* (2013.01); *G06F 17/30696* (2013.01)

(58) Field of Classification Search
CPC ......... G06F 17/30616; G06F 17/30011; G06F 17/30911; G06F 17/30696; G06F 17/30; G06F 17/30554; G06F 17/30548; G06F 3/0481; G06F 17/30684; G06F 3/04842; G06F 8/443; G06F 17/30601; G06F 17/30528; G06F 17/30525; H04L 9/3234; H04L 63/10; H03M 7/00; G06Q 10/10; G06Q 50/01; G06G 17/30867
See application file for complete search history.

(56) References Cited

U.S. PATENT DOCUMENTS

| 5,793,381 A * | 8/1998 | Edberg ................ G06F 17/2223 345/467 |
| 6,049,869 A * | 4/2000 | Pickhardt .......... G06F 17/30985 707/E17.041 |
| 6,381,616 B1 * | 4/2002 | Larson .............. G06F 17/30439 707/E17.032 |
| 6,400,287 B1 * | 6/2002 | Ehrman .................. H03M 7/30 715/258 |

(Continued)

OTHER PUBLICATIONS

Zitting et al., "Improve Encoding Detection Speed and Accuracy," Apache Tika Issues, Nov. 13, 2009, p. 1-2, Tika-322, Apache Software Foundation, https://issues.apache.org/jira/browse/TIKA-322, Accessed on Apr. 13, 2016.

(Continued)

*Primary Examiner* — Anh Ly
(74) *Attorney, Agent, or Firm* — Robert J. Shatto

(57) ABSTRACT

A method for indexing with redundant information. The method may identify unknown code points for a document in response to an indexing request for the document. The method may further convert the identified unknown code points into a plurality of converted code points. Each set of converted code points of the plurality uses a different codepage. The method may further identify sets of same code points and sets of redundant code points from the plurality of converted code points. The method may build an index based on the sets of same code points and the sets of redundant code points.

11 Claims, 4 Drawing Sheets

(56) References Cited

U.S. PATENT DOCUMENTS

| | | | |
|---|---|---|---|
| 7,007,015 B1 | 2/2006 | Nayak | |
| 7,191,114 B1* | 3/2007 | Murray | G06F 17/2217 |
| | | | 704/8 |
| 7,376,642 B2 | 5/2008 | Nayak | |
| 7,945,533 B2 | 5/2011 | Krishnaprasad et al. | |
| 8,219,544 B2 | 7/2012 | Bluger et al. | |
| 8,264,385 B1* | 9/2012 | Dewan | G06F 11/3692 |
| | | | 341/50 |
| 8,352,463 B2 | 1/2013 | Nayak et al. | |
| 8,661,019 B2* | 2/2014 | Colby | G06F 17/30498 |
| | | | 707/714 |
| 8,843,507 B2 | 9/2014 | Xiao et al. | |
| 9,501,682 B1* | 11/2016 | He | G06K 7/1443 |
| | | | 707/E17.014 |
| 2003/0061209 A1 | 3/2003 | Raboczi | |
| 2004/0006569 A1* | 1/2004 | Carlin | G06F 17/22 |
| | | | 707/E17.039 |
| 2004/0237046 A1* | 11/2004 | Burchall | G06F 17/2217 |
| | | | 715/256 |
| 2007/0115488 A1* | 5/2007 | Engelman | G06F 17/214 |
| | | | 358/1.13 |
| 2008/0005671 A1 | 1/2008 | Ahangama | |
| 2008/0140616 A1 | 6/2008 | Encina | |
| 2008/0244378 A1* | 10/2008 | Chen | G06K 9/00456 |
| | | | 715/226 |
| 2008/0276316 A1* | 11/2008 | Roelker | H04L 63/0227 |
| | | | 726/23 |
| 2009/0100022 A1* | 4/2009 | Nayak | G06F 17/30613 |
| | | | 707/E17.014 |
| 2011/0184933 A1* | 7/2011 | Colby | G06F 17/30498 |
| | | | 707/714 |
| 2014/0258316 A1 | 9/2014 | O'Hagan | |
| 2016/0062957 A1 | 3/2016 | Chen et al. | |
| 2016/0062965 A1* | 3/2016 | Bostick | G06F 17/2223 |
| | | | 704/9 |
| 2016/0134303 A1* | 5/2016 | Cox | G06F 17/2264 |
| | | | 341/50 |
| 2017/0048069 A1* | 2/2017 | Baessler | G06F 17/30911 |
| | | | 707/E17.009 |

OTHER PUBLICATIONS

Fan et al., "Full Text Indexing in a Database System," U.S. Appl. No. 15/888,170, filed Feb. 5, 2018.

List of IBM Patents or Patent Applications Treated as Related, Feb. 1, 2018, 2 pgs.

* cited by examiner

FULL TEXT INDEXING IN A DATABASE SYSTEM

BACKGROUND

The present invention relates generally to the field of information processing, and more particularly to information processing within a database system.

With an increasing development of information technology, information discovery is becoming more important. Information can be searched from a plurality of documents by using a keyword search. A full text index may be needed for the plurality of documents to facilitate the keyword search. Some documents, such as PDF files, Office files, and/or compressed files, contain unstructured data. Unstructured data may be information that may not by organized according to a predefined model (e.g., codepage) but may contain dates and times. Structured data may be information structured in a way that can be manipulated and processed according to predefined models that may rely on patterns. A codepage may be a table of values that describes the characters of a document. Codepages may be used to structure data within a document.

SUMMARY

According to one exemplary embodiment, a method for indexing with redundant information. The method may include identifying unknown code points for a document in response to an indexing request for the document. The method may further include converting the identified unknown code points into a plurality of converted code points. Each set of converted code points of the plurality uses a different codepage. The method may further include identifying sets of same code points and sets of redundant code points from the plurality of converted code points. The method may further include building an index based on the sets of same code points and the sets of redundant code points.

According to another exemplary embodiment, a computer system for indexing with redundant information is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include identifying unknown code points for a document in response to an indexing request for the document. The method may further include converting the identified unknown code points into a plurality of converted code points. Each set of converted code points of the plurality uses a different codepage. The method may further include identifying sets of same code points and sets of redundant code points from the plurality of converted code points. The method may further include building an index based on the sets of same code points and the sets of redundant code points.

According to yet another exemplary embodiment, a computer program product for indexing with redundant information is provided. The computer program product may include one or more computer-readable storage devices and program instructions stored on at least one of the one or more tangible storage devices, the program instructions executable by a processor. The computer program product may include program instructions to identify unknown code points for a document in response to an indexing request for the document. The computer program product may further include program instructions to convert the identified unknown code points into a plurality of converted code points. Each set of converted code points of the plurality uses a different codepage. The computer program product may further include program instructions to identify sets of same code points and sets of redundant code points from the plurality of converted code points. The computer program product may further include program instructions to build an index based on the sets of same code points and the sets of redundant code points.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
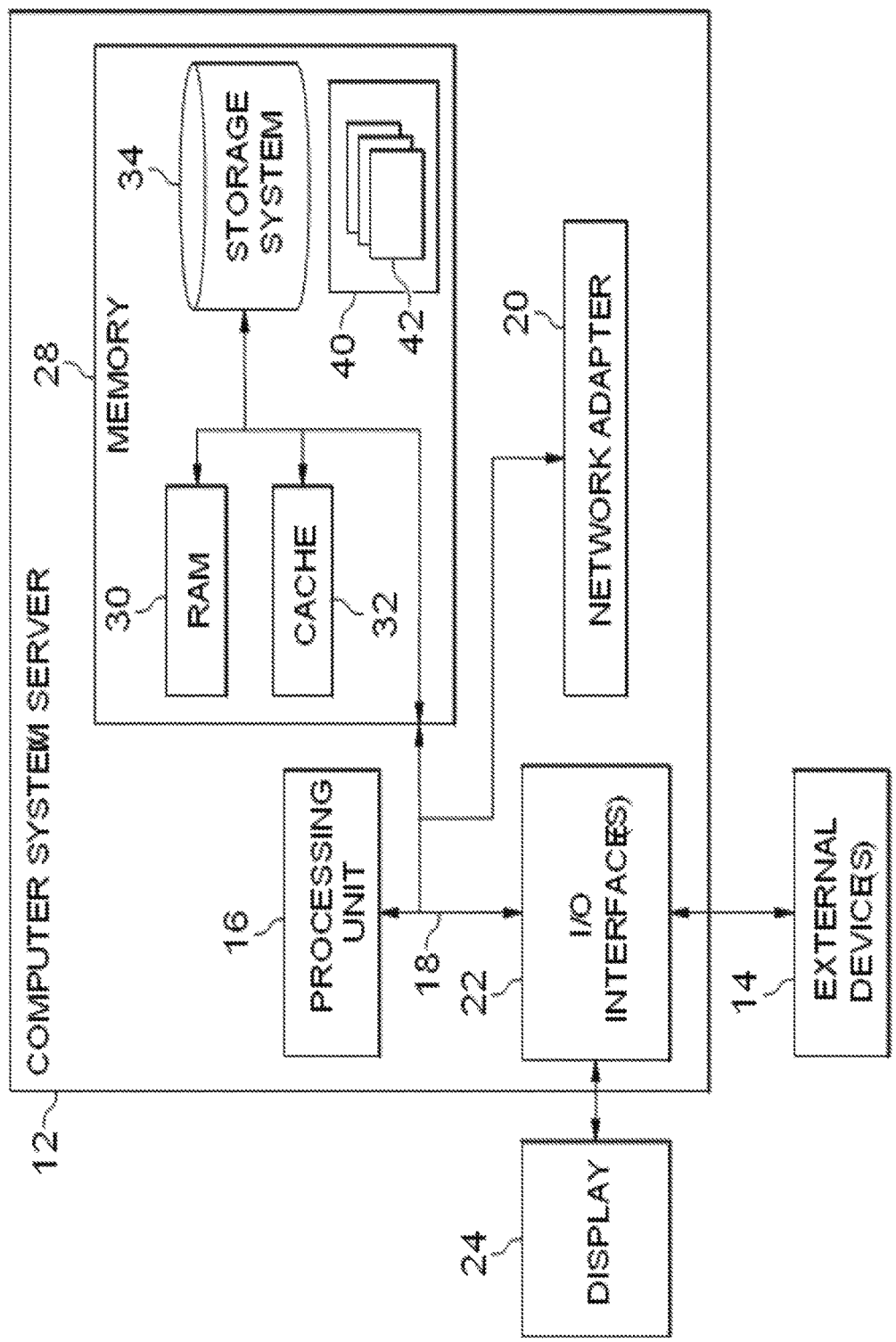
FIG. 1 shows an exemplary computer system which is applicable to implement an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 1, an exemplary computer system/server 12 which is applicable to implement the at least one embodiment of the present disclosure is shown. The computer system/server 12 is only illustrative and is not intended to suggest any limitation on the scope of use or functionality of the embodiments of the disclosure described herein.

As shown in FIG. 1, the computer system/server 12 may be in a form of a general-purpose computing device. Components of the computer system/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, but not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 typically includes a variety of computer system readable media. Such media may be any available media that is accessible by a computer system/server 12, and it includes both volatile and non-volatile media, removable and non-removable media.

The system memory 28 may include a computer system readable media in a form of a volatile memory, such as a random access memory (RAM) 30 and/or a cache memory 32. The computer system/server 12 may further include other removable/non-removable, volatile/non-volatile computer system storage media. By way of example only, a storage system 34 can be provided for reading data from and writing data to a non-removable, non-volatile magnetic medium (not shown and typically called a "hard drive"). Although not shown, a magnetic disk drive for reading data from and writing data to a removable, non-volatile magnetic disk (e.g., a "floppy disk"), and an optical disk drive for reading data from or writing data to a removable, non-volatile optical disk such as a CD-ROM, DVD-ROM or other optical media can be provided. In such instances, each can be connected to the bus 18 by one or more data media interfaces. As will be further depicted and described below, the memory 28 may include at least one program product having a set (e.g., at least one) of program modules that are configured to carry out functions of the embodiments of the invention.

A program/utility 40, having a set (at least one) of program modules 42, by way of example, but not limitation, as well as an operating system, one or more application programs, other program modules, and program data, may be stored in memory 28. Each of the operating system, the one or more application programs, other program modules, and the program data and some combinations thereof, may include an implementation of a networking environment. The program modules 42 generally carry out the functions and/or methodologies of the embodiments of the disclosure as described herein.

The computer system/server 12 may also communicate with one or more external devices 14 such as a keyboard, a pointing device, a display 24, etc.; one or more devices that enable a user to interact with the computer system/server 12; and/or any devices (e.g., a network card, a modem, etc.) that enable computer system/server 12 to communicate with one or more other computing devices. Such communication can occur via Input/Output (I/O) interfaces 22. Still yet, the computer system/server 12 can communicate with one or more networks such as a local area network (LAN), a general wide area network (WAN), and/or a public network (e.g., the Internet) via network adapter 20. As depicted, the network adapter 20 communicates with the other components of the computer system/server 12 via the bus 18. It should be understood that although not shown, other hardware and/or software components could be used in conjunction with the computer system/server 12. Examples, include, but are not limited to: microcodes, device drivers, redundant processing units, external disk drive arrays, RAID systems, tape drives, and data archival storage systems, etc.

In the computer science field, terms "character encoding", "character map", "character set" and "codepage" were historically synonymous, as the same standard would specify a repertoire of characters and how they were to be encoded into a stream of code units—usually with a single character per code unit. The terms now have related but distinct meanings, reflecting the efforts of standard bodies to use precise terminology when unifying many different encoding systems. Regardless, the terms are still used interchangeably, with character sets being nearly ubiquitous.

In the character encoding terminology, a code point or code position is any of numerical values that make up a code space. Many code points represent single characters but they can also have other meanings, such as a meaning for formatting.

With the explosion of electronic information, the type of information varies quite often. The information may be saved in one container, but with different codepages. One scenario is that for the plain text with unknown codepages, if it is assumed that a plain text are encoded with a default codepage, then an index built for the plain text is also based on the default codepage, it may be misunderstood because the full text index is inaccurate and insufficient. For example, an email message itself contains an email body, but it also contains two attachments, such as a Word document and a PDF file. The two attachments may have different codepages from that of the email body. When the email body and its attachments are parsed to create an index, it is possible to create a wrong index if there is no correct codepage indication for each of the individual email parts, including the email body and the attachments. Sometimes, the default codepage in the email body cannot be applied for the email attachments.

Below is an "eml" representation for one sample email message with 2 attachments.

```
From: Sender <Sender@company.com>
To: Reciever@company.com
Subject: email subject
Thread-Topic: email subject
Thread-Index: AQHReq6D5vpKsQQQl0avhlWEXjOzow==
Date: Thu, 10 Mar 2016 09:24:00 +0000
Message-ID:
<PS1PR06MB11296A8701339B2F0CAAF717CCB40@PS1PR06MB1129.apcprd06.prod.outlook
.com>
Accept-Language: zh-CN, en-US
MIME-Version: 1.0
Content-Type: multipart/mixed;
boundary="_005_PS1PR06MB11296A8701339B2F0CAAF717CCB40PS1PR06MB1129apcp_"
Content-Language: zh-CN
--_005_PS1PR06MB11296A8701339B2F0CAAF717CCB40PS1PR06MB1129apcp_
Content-Type: multipart/alternative;
boundary="000_PS1PR06MB11296A8701339B2F0CAAF717CCB40PS1PR06MB1129apcp_"
--_000_PS1PR06MB11296A8701339B2F0CAAF717CCB40PS1PR06MB1129apcp_
Content-Transfer-Encoding: base64
Content-Type: text/plain; charset="gb2312"
```

```
ZW1haWwgYm9keQ0K
--__000__PS1PR06MB11296A8701339B2F0CAAF717CCB40PS1PR06MB1129apcp__
Content-Transfer-Encoding: quoted-printable
Content-Type: text/html; charset="gb2312"
<html>
<head>
</head>
<body dir=3D"ltr">
<p>email body<br>
</body>
</html>
--__000__PS1PR06MB11296A8701339B2F0CAAF717CCB40PS1PR06MB1129apcp__--
--__005__PS1PR06MB11296A8701339B2F0CAAF717CCB40PS1PR06MB1129apcp__
Content-Type: application/pdf; name="Pdf.pdf" ; charset="ISO-8859-2"
Content-Disposition: attachment; filename="Pdf.pdf" ; size=82394;
        creation-date="Thu, 10 Mar 2016 09:23:44 GMT";
        modification-date="Thu, 10 Mar 2016 09:23:44 GMT"
Content-Description: Pdf.pdf
Content-Transfer-Encoding: base64
<binary of Pdf.pdf>
--__005__PS1PR06MB11296A8701339B2F0CAAF717CCB40PS1PR06MB1129apcp__
Content-Type: application/msword; name="Word.doc" ; charset="unknown"
Content-Disposition: attachment; filename="Word.doc"; size=26112;
        creation-date="Thu, 10 Mar 2016 09:23:45 GMT";
        modification-date="Thu, 10 Mar 2016 09:23:45 GMT"
Content-Description: Word.doc
Content-Transfer-Encoding: base64
<binary of Word.doc>
--__005__PS1PR06MB11296A8701339B2F0CAAF717CCB40PS1PR06MB1129apcp__--
```

In the above example, "ISO-8859-12" is a codepage used to describe code points of the Pdf.pdf document, so the code points of the Pdf.pdf document are referred to as "known code points," while the codepage used to describe code points of the Word.doc document has not been known yet, so the code points of the Word.doc document are referred to as "unknown code points," Thus, it may be quite necessary to use mulitiple codepages to parse the Word.doc document, and then build the index for the unknown part of the email, so that the possibility of creating index by using a correct codepage can be increased, and the email information can be searched correctly.

Figure 2:
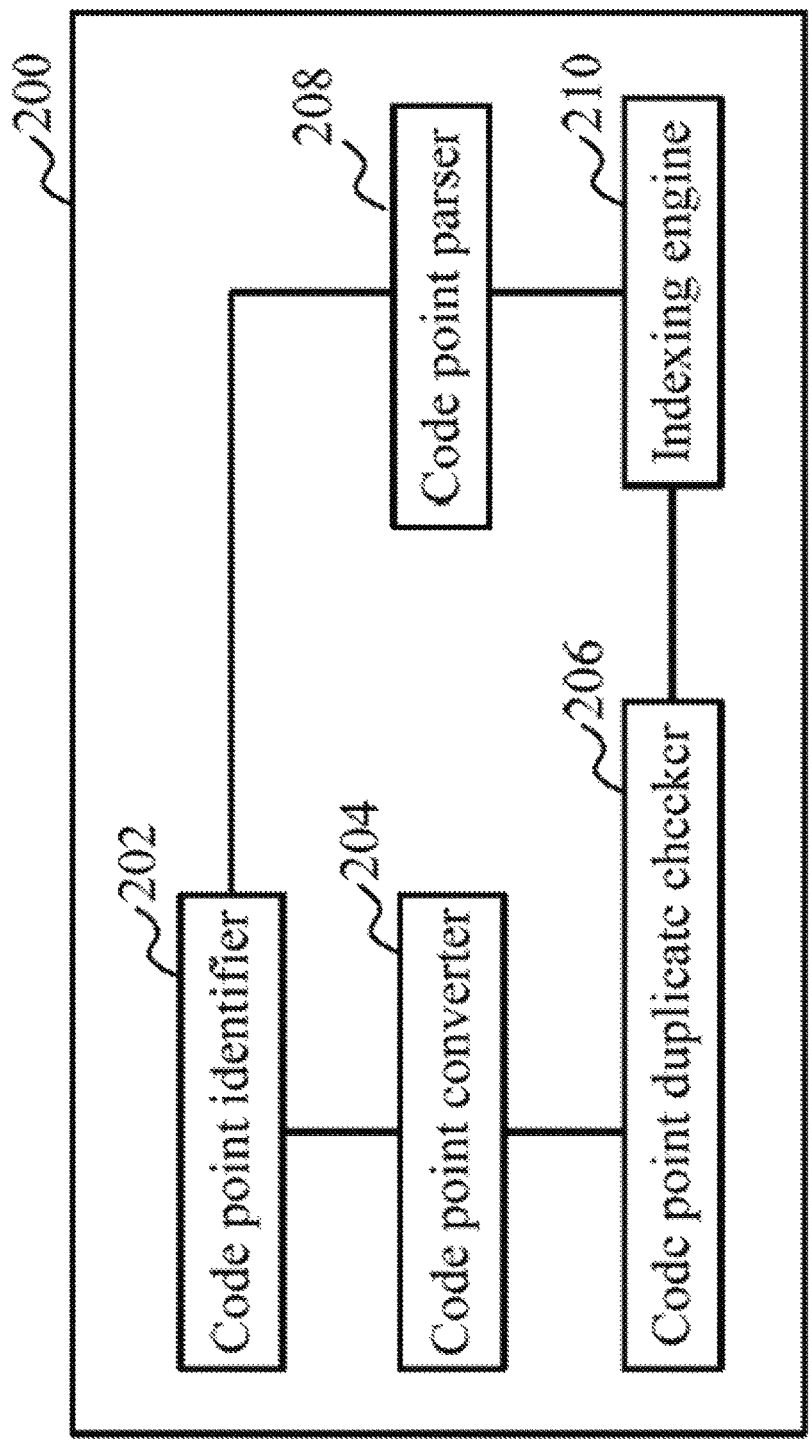
FIG. 2 is a block diagram showing an apparatus for indexing according to an embodiment of the present disclosure.

Referring now to FIG. 2, an exemplary block diagram illustrating an apparatus 200 for indexing according to at least one embodiment of the present disclosure. As shown in FIG. 2, the apparatus 200 for indexing according to an embodiment of the present disclosure may include: a code point identifier 202, a code point converter 204, a code point duplicate checker 206, a code point parser 208, and an indexing engine 210.

The apparatus 200 may be implemented via a computer system 12 as previously described in FIG. 1, whereby the code point identifier 202, the code point converter 204, the code point duplicate checker 206, a code point parser 208, and the indexing engine 210 may be respectively implemented by the processor unit 16 (FIG. 1) in the computer system 12 (FIG. 1) running computer program instructions stored in the memory 28 (FIG. 1). For example, the code point identifier 202 may correspond to a first program instruction run by the processor unit 16 (FIG. 1), the code point converter 204 may correspond to a second program instruction run by the processor unit 16 (FIG. 1), the code point duplicate checker 206 may correspond to a third program instruction run by the processor unit 16 (FIG. 1), the code point parser 208 may correspond to a fourth program instruction run by the processor unit 16 (FIG. 1), and the indexing engine 210 may correspond to the fifth program instruction run by the processor unit 16 (FIG. 1), etc. The code point identifier 202, the code point converter 204, the code point duplicate checker 206, the code point parser 208, and the indexing engine 210 may be realized in a manner of hardware by solidifying program instruction codes in the dedicated processor unit, respectively. The scope of the present disclosure is not limited by the above various implementations.

The code point identifier 202 is configured to, in response to an indexing request for a document, identify the unknown code points for a document. In one example of the present disclosure, the indexing request for a document may be input from an external device. According to one embodiment of the present disclosure, the code point identifier 202 also identifies the known code points for the documents. The documents for indexing may be, but not limited to a text file, Office file, PDF file, message of mail body, compressed file, site page, links, etc., and these types of files do not limit the scope of the present disclosure. Among the above files such as text file, Office file, PDF file, message of mail body, compressed file, site page, links, etc., some of the above files belong to files with plain text data, and some of the above files belong to files with unstructured data.

For the plain text data or unstructured data from a document, if a known codepage (charset) is provided (i.e., a corresponding character set for interpreting the code point is known), then it is referred to as "known code point." For unstructured data or plain text data without a known codepage, it is referred to as "unknown code point." The known code points can be transmitted directly to the code point parser 208 from the code point identifier 202 for generating one set of converted code points for indexing in a posting-list repository (not shown). Specifically, in the code point parser 208, the known code points are converted into one set of converted code points, by using a third party tool directly, or by using embedded codes developed by a programmer. The above conversions may use a codepage indicated by the known code points.

The specific position of the posting-list repository does not limit the scope of the present disclosure but the posting-list repository can be integrated with the apparatus 200 as one apparatus, or it can be located on an external apparatus that can transmit and/or receive data with the apparatus 200. The unknown code points may not be suitable to be converted to the converted code points by using a default codepage to build the index, so they may be passed to the code point converter 204 for a further processing.

Additionally, if the unknown code points occur due to lack of a correct codepage, the correct codepage may be needed to convert the unknown code points. A plurality of codepages can be used to convert the unknown code points. Thus, the code point converter 204 may convert the unknown code points into a plurality of converted code points, whereby each set of converted code points uses a different codepage either by third-party tools or by embedded program codes. For example, the code point converter 204 may include a first parser that may use a first codepage to convert the unknown code points into a first set of converted code points, and a second parser that may use a second codepage, different from the first codepage, to convert the unknown code points into a second set of converted code points. The conversion may be done by a third party tool (e.g., software program). The third-party tool may be a PDF parser, office file parser, message of mail parser, compressed file parser, etc. When a different third-party tool, which may use different codepages, is used to convert a set of unknown code points, the generated converted code points may not be completely the same. For example, for converting a set of unknown code points, a first set of converted code points may be generated with a first codepage, and a second set of converted code points may generated with a second codepage that may be different from the first codepage. The first set of converted code points may be compared with the second set of converted code points, then some sets of redundant code points and some sets of different code points both within the first and second sets of converted code points may be found. The number of the codepages or third-party tools based on embodiments of the present disclosure can be determined according to actual needs by those skilled in the art, and the number does not limit the scope of the present disclosure.

The codepages according to at least one embodiment of the present disclosure could be different character sets (charsets), such as, but not limited to, charset ISO8859-1, charset GB18030, charset ISO8859-15, charset Windows-1252, GB2312, etc. The codepages according to at least one embodiment of the present disclosure are not limited to the first codepage and the second codepage, but may include more codepages. Here, the type and quantity of the codepages can be determined by one skilled in the art according to the actual needs, and the quantity of codepages may not limit the scope of the present disclosure. Furthermore, the number of existing codepages in the art is over at least one hundred.

The above-mentioned different third-party tools and different codepages can be derived from a knowledge base (not shown). The specific location of knowledge base does not limit the scope of the present disclosure. The knowledge base can be integrated with the apparatus 200 of the present disclosure as one apparatus, or can be located on an external apparatus which transmits and/or receives data to/from the apparatus 200 of the present disclosure.

Figure 3:
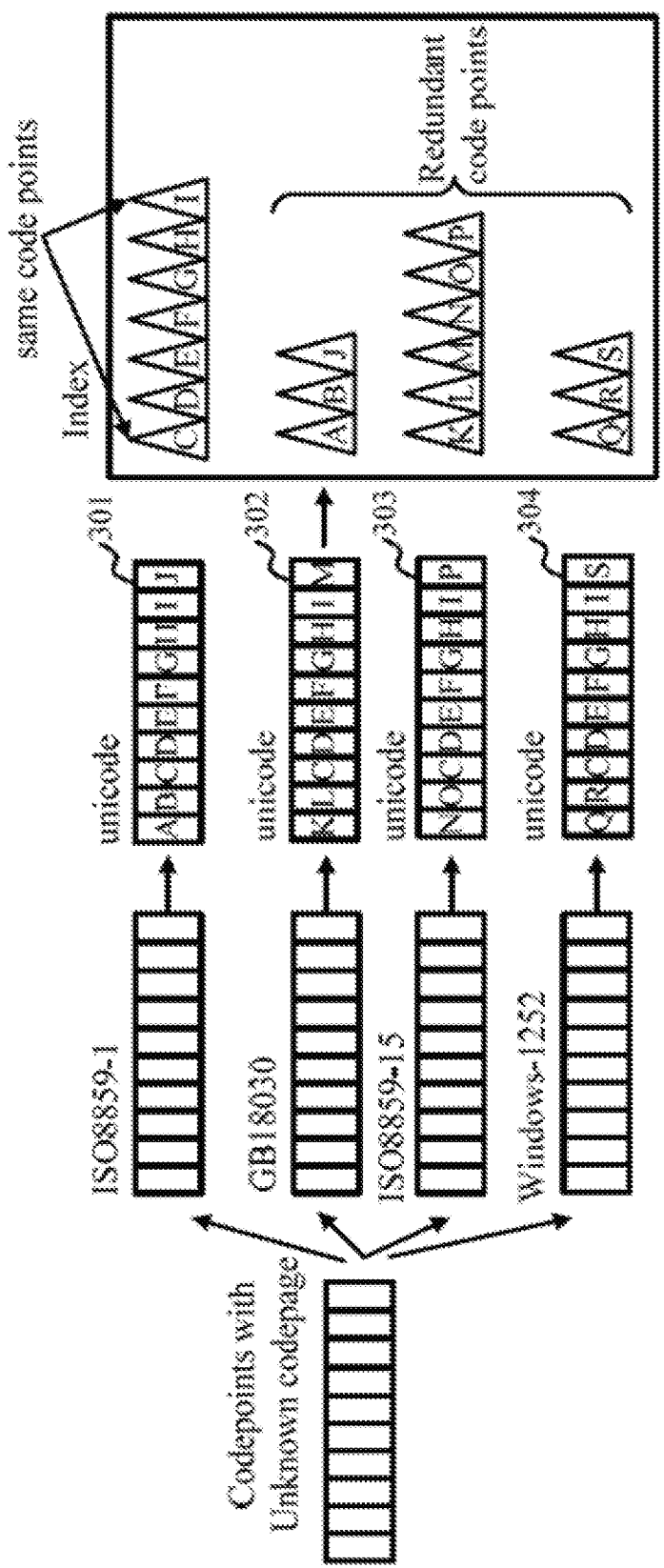
FIG. 3 is a diagram showing an operating principle of a code point converter and a code point duplicate checker according to an embodiment of the present disclosure.

FIG. 3 is a schematic diagram showing the operating principle of the code point converter 204 (FIG. 2) and the code point duplicate checker 206 (FIG. 2) according to at least one embodiment of the present disclosure. Referring to FIG. 3, the unknown code points are output from the code point identifier 202 (FIG. 2), as shown in FIG. 3 on the left side. Suppose these unknown code points are provided without a known codepage for interpretation, they are input into the code point converter 204 (FIG. 2). The code point converter 204 (FIG. 2) may include four code point parsers, which are a Parser 1, a Parser 2, a Parser 3, and a Parser 4, whose corresponding codepages are ISO8859-1, GB18030, ISO8859-15, and Windows-1252, respectively.

In the Parser 1, the codepage ISO8859-1 may be used to interpret the above unknown code points to obtain a first set of converted code points (Unicode) as shown by reference numerals 301, that is, characters A, B, C, D, E, F, G, H, I, and J. In the Parser 2, the codepage GB18030 may be used to interpret the above unknown code points to obtain a second set of converted code points (Unicode) as shown by reference numerals 302, that is, characters K, L, C, D, E, F, G, H, I, and M. In the Parser 3, the codepage GB8859-15 may used to interpret the above unknown code points to obtain a third set of converted code points (Unicode) as shown by reference numerals 303, that is, characters N, O, C, D, E, F, G, H, I, and P. In the Parser 4, the codepage Windows-1252 may be used to interpret the above unknown code points to obtain a fourth set of converted code points (Unicode) as shown by reference numerals 304, that is, the characters Q, R, C, D, E, F, G, H, I, and S.

Referring back to FIG. 2, the plurality of converted code points generated by the code point converter 204 (FIG. 2) are passed to the code point duplicate checker 206 (FIG. 2). The code point duplicate checker 206 (FIG. 2) may be configured to identify sets of same code points and sets of different code points from a plurality of converted code points. For example, if there are two sets of same code points, they may be redundant sets, and one is from the first set of converted code points and another is from the second set of converted code points, the code point duplicate checker 206 (FIG. 2) may retain one copy, i.e., only one copy of the set of redundant code points may be retained, which will be later described in detail with examples in FIG. 4. Then, the retained code points are passed to the indexing engine 210 (FIG. 2) for building an index. Here, for convenience of description, the above different code points could be referred to as redundant code points.

Referring back to FIG. 3, in the above four sets of converted code points parsed by using different codepages, there are four same sets of same code points (characters) "C, D, E, F, G, H, and I," which can also be referred to as "duplicate code points." According to one embodiment, one copy (e.g., one set of same code points) "C, D, E, F, G, H, and I" should be retained by the code point duplicate checker 206 (FIG. 2). According to one embodiment of the present disclosure, the "one set of same code points" may include only one code point, such as code point "C", instead of the seven code points "C, D, E, F, G, H, and I". Meanwhile, in each set of converted code points, there may also be code points different from each other, such as A, B, and J in a first set, K, L, and M in a second set, N, O, and P in a third set, and Q, R, and S in a fourth set. Such different code points in each set here can be referred to as "sets of redundant code points."

Specifically, for four sets of same code points, only one set is retained therein. For example, only one copy of the set of same code points "C, D, E, F, G, H, and I" in one set is retained, and the same code points in other sets should be deleted. Meanwhile, in the code point duplicate checker 206 (FIG. 2), the redundant code points such as "A, B, and J" in the first set, "K, L, and M" in the second set, "N, O, and P" in the third set, "Q, R, and S" in the fourth set are retained. The above four sets of same code points in the four sets of converted code points may not limit the scope of the present disclosure. In another embodiment, there may be another number of sets of same code points in the plurality of converted code points. For example, during the procedure of converting the unknown code points, another four sets of same code points "U, V, and W" may occur in each of the four sets of converted code points. In this case, two sets of same code points "C, D, E, F, G, H, and I" and "U, V, and W" should be retained. The code point duplicate checker 206 (FIG. 2) may transmit the retained sets to the indexing engine 210 (FIG. 2).

Referring back to FIG. 2, the indexing engine 210 (FIG. 2) may be configured to build an index based on the converted point codes output from the code point parser 208 (FIG. 2), the sets of redundant code points, and the sets of same code points output from the code point duplicate checker 206 (FIG. 2). According to another embodiment, the indexing engine 210 (FIG. 2) may be configured to build an index based on the converted point codes output from the code point parser 208 (FIG. 2), the sets of redundant code points, and one set of same code points output from the code point duplicate checker 206 (FIG. 2). Here, for convenience of description, the index that is built based on the redundant code points may be referred to as redundant index. Further, the built index may be stored in the posting-list repository.

Specifically, in the indexing engine 210 (FIG. 2), an association may be built between the converted code points and the file in accordance with frequency, location, and other information that the converted code points appear in the file, as well as information on the association stored in the posting-list repository for building an index. The detailed implementation of the indexing engine 210 (FIG. 2) may be well known by those skilled in the art, so the detailed implementation is omitted here.

In summary, the present disclosure uses a plurality of code pages to parse a document, and builds index based on the parsed output to increase quality of search. In other words, the present disclosure builds the index by taking advantage of all the retained code points for a document by using multiple codepages.

Moreover, a weight may be assigned to a set of converted code points. Further, different weights may be assigned to different sets of converted code points depending on different codepages. Here, the weight can be any value between 0 and 1. A set of redundant code points from a set of converted code points has the same weight as the set. A set of redundant code points is input into the indexing engine, and the index engine outputs a redundant index based on the set of redundant code points. Optionally, the redundant index may have the same weight as the set of redundant code points.

A weight table is shown as the following Table 1.

TABLE 1

| Parser ID | Weight | Codepage |
|---|---|---|
| Parser 1 | 0.7 | ISO8859-1 |
| Parser 2 | 0.4 | GB18030 |
| Parser 3 | 0.3 | ISO8859-15 |
| Parser 4 | 0.5 | Windows-1252 |

Herein is an example, in which the redundant index may be generated by a set of redundant code points "A, B, and J" converted by the code point parser 1 using the codepage ISO8859-1. In the built index, a redundant index from a set of converted code codes may be assigned with the same weight as the set of converted code codes. For example, as shown in the Table 1, the redundant index has the highest weight value 0.7. Furthermore, the specific weight value does not limit the scope of the present disclosure, which can be changed based on different contexts, or continuous accumulation of hits during the subsequent searching process, etc. Additionally, the above weight table can be stored in a knowledge base (not shown).

According to yet another embodiment, the index built by the indexing engine 210 (FIG. 2) could be used by a search engine (not shown) for a retrieval operation. The search engine may be various search engines well known to those skilled in the art, such as, but not limited to, any third-party search engine or search tool. When a search engine receives a search request, for example, when a user enters a keyword in the search engine and clicks a button such as "Search" the search engine traverses the posting-list repository, from which an index matching the keywords entered by the user is found, and associated documents are found. The search engine normally provides a search result list, which may be a list of the documents.

The search engine sorts all resultant documents based on the search conditions stored in the knowledge base. If a user finds documents hit by the redundant index, the weight of the redundant index will be increased. That is, if the index for searching is the redundant index built in accordance with the embodiments of this disclosure, the weight of the redundant index will be computed based on a matching degree of the keyword with the associated documents, such as the location and frequency of the keyword appearing in the documents. If the matching degree of the keyword with the found associated documents is high, the weight of the redundant index will be increased. And when a plurality of documents are found in accordance with the keyword entered by the user, they will be presented to the user in a descending order of the weights of the redundant indexes. That is, in response to a search request, a plurality of documents are presented as a search result list, whereby the position of a document in the list is based on the redundant indexes used by the document. Thus, with the increasing of data in the knowledge base and the posting-list repository, a much more accurate list of search results than the existing technology may be provided.

In accordance with the embodiments of the present disclosure, the use of redundant indexes can hit different redundant information during the search, such as documents. According to the user's choice, different redundant indexes have different weights, and the hit redundant information could be displayed together with the weights to increase accuracy.

Figure 4:
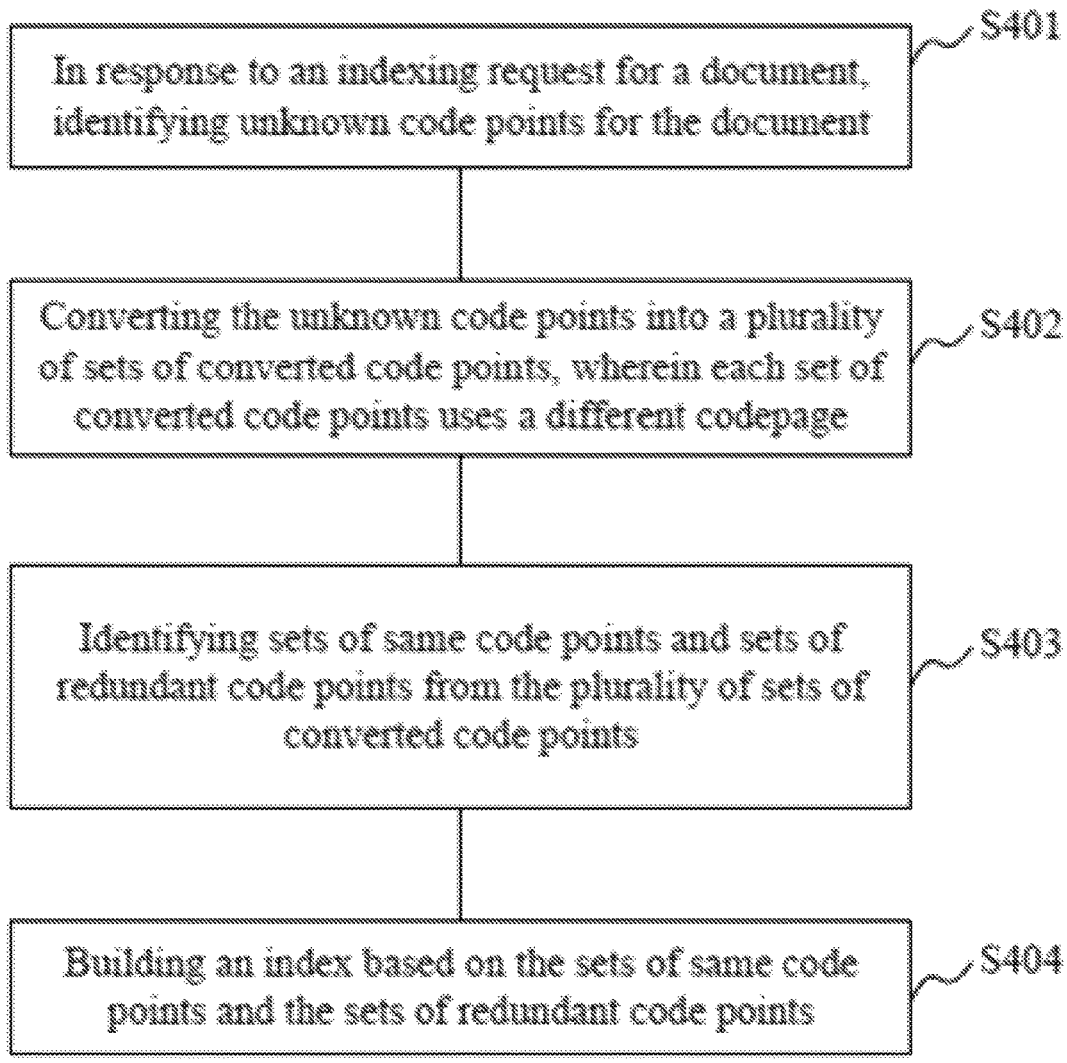
FIG. 4 is an operational flowchart for indexing according to an embodiment of the present disclosure.

FIG. 4 is a flowchart illustrating a computer-implemented method for indexing in accordance with an embodiment of the present disclosure. As shown in FIG. 4, in step S401, in response to an indexing request for a document, unknown code points for the document are identified. In step S402, the unknown code points are converted into a plurality of converted code points, whereby each set of converted code points uses a different codepage. In step S403, sets of same code points and sets of redundant code points are identified from each set of converted code points of the plurality of converted code points. In step S404, an index is built based on the sets of redundant code points and the sets of the same code points.

Each of the above steps can be implemented by running in the processing unit 16 (FIG. 1) of the computer system 12 (FIG. 1) the computer program instructions stored in the memory 28 (FIG. 1). For example, the step S401 is implemented by a first program instruction running in the processing unit 16 (FIG. 1), the step S402 is implemented by a second program instruction running in the processing unit 16 (FIG. 1), the step S403 is implemented by a third program instruction running in the processing unit 16 (FIG. 1), and the step S404 is implemented by a fourth program instruction running in the processing unit 16 (FIG. 1).

Each of the above steps can also be implemented by the apparatus 200 (FIG. 2). For example, the step S401 is implemented by the code point identifier 202 (FIG. 2), the step S402 is implemented by the code point converter 204 (FIG. 2), the step S403 is implemented by the code point duplicate checker 206 (FIG. 2), and the step S404 is implemented by the indexing engine 210 (FIG. 2).

In another embodiment, the step S402 of the method further includes a step in which the unknown code points are converted into a first set of converted code points with a first codepage, and the unknown code points are converted into a second set of converted code points with a second codepage different from the first codepage.

The method further includes a step in which the following code points are retained. For example, the sets of redundant code points and the sets of same code points in the first set of converted code points and in the second set of converted code points are retained. If two sets of same code points from the first set of code points and the second set of code points are the same, only one copy is retained.

The method further includes a step in which a weight assigned to a set of converted code points. Then, different weights are assigned to the redundant indexes which are built based on the different sets of redundant code points. Furthermore, in the built index, a redundant index from a set of converted code points is assigned with the same weight as the set of converted code points.

The method may further include a step in which the searched documents based on the redundant indexes are presented to the user in descending order of the weights of the redundant indexes. A display 24 (FIG. 1) could be used to present the resulted documents to the user in a manner of displaying information on its screen. The specific presentation manner does not constitute a limitation to the scope of the present disclosure. In an example, the different weights are based on the different codepages. The method may further include a step in which in response to a search request, a plurality of documents are presented as a search result list, whereby the position of a document in the list is based on the redundant indexes used by the document. The method may further include steps, in which, in response to an indexing request for a document, known code points are identified; the known code points are converted into one set of converted code points using codepage indicated by the known code points; and, an index is built based on the one set of converted code points.

According to yet another embodiment, a computer system for indexing is also provided. The computer system may be implemented by the computer system 12 (FIG. 1), which includes for example a memory 28 (FIG. 1), at least one processor 16 (FIG. 1), and a display 24 (FIG. 1), etc.

According to at least one other embodiment of the present disclosure, a computer program product for indexing is further provided. The computer program product may include a computer readable storage medium. The computer readable storage medium stores computer program instructions. The computer program instructions can be run by at least one processor, such that the at least one processor performs an above-described method according to an embodiment of the present disclosure.

As previously mentioned, in a current area of big data or audit areas, searching and finding of information may be very important and critical. If the potential information cannot be searched, valuable information cannot be found, and there would be a high potential risk.

With embodiments of the present disclosure, a redundant index could be used to index information, which can greatly increase the accuracy of the index. Thus, more valuable information and more potential information can be found. In addition, the embodiments of the present disclosure could make use of multiple contexts to help convert the raw data properly into unicodes, for example by using an original status of information, such as the codepage of an e-mail sender, and the codepage of the current operating system, etc. The use of these codepages can generate multiple unicodes, rather than just a single unicode, thereby increasing confidence for the search.

According to another embodiment of the present disclosure, a feedback mechanism may be set by detecting the selection of the user for hit list. For example, the index weight could be set according to a matching degree of the hit. For example, the higher the matching degree of the hit is, the higher the weight of the relevant index is, and the weight can be used for subsequent searches.

Obviously, with the present disclosure, higher search accuracy could be achieved than the method of prior art. Although according to the embodiments of the present disclosure, the number of the index in the posting-list repository may be increased with respect to the number of the index in the prior art due to the use of the redundant index, which has been proved by tests that the increased ratio is not high, and with the increasing of the test data, the increased proportion of the number of indexes is reduced. Thereby, the proportion of the increased number of indexes is controllable.

A computer-implemented method for indexing, a computer system and computer program product are described in combination with the embodiments of the present disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for indexing with redundant information, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    identifying, by a processor, a plurality of unknown code points for a document in response to an indexing request for the document, wherein a code point is a numerical value that is assigned to a character within a codepage, wherein the codepage is a table of numerical values that defines a character set, wherein identifying the plurality of unknown code points for the document further includes:
    receiving, by the processor, the document, wherein the document includes one or more attachments;
    parsing, utilizing multiple codepages, each of the one or more attachments for the plurality of unknown code points, wherein the unknown code points are within at least one of the one or more attachments;
converting the identified plurality of unknown code points into a plurality of converted code points, wherein each of the plurality of converted code points uses a different codepage, wherein the converting the identified plurality of unknown code points into the plurality of converted code points further comprises:
    converting the identified plurality of unknown code points into a first set of converted code points with a first codepage; and
    converting the identified plurality of unknown code points into a second set of converted code points with a second codepage;
identifying sets of same code points and sets of redundant code points from the plurality of converted code points; and
building an index based on the identified sets of same code points and the identified sets of redundant code points.

2. The computer system of claim 1, further comprising:
retaining the sets of same code points and the sets of redundant code points.

3. The computer system of claim 2, wherein the retaining the sets of same code points further comprises:
    retaining a first set of same code points from the first set of converted code points; and
    retaining a second set of same code points from the second set of converted code points.

4. The computer system of claim 1, further comprising:
    assigning a weight to the first set of converted code points and the second set of converted code points.

5. The computer system of claim 4, wherein, in the built index, a redundant index is constructed from the first set of redundant code points and the second set of redundant code points, and is assigned with a same weight as the first set of converted code points and the second set of converted code points.

6. The computer system of claim 5, further comprising:
    presenting a plurality of documents as a search result list in response to a search request, wherein a position of a search result document in the search result list is based on redundant indexes used by the search result document.

7. A computer program product for indexing with redundant information, the computer program product comprising:
    one or more computer-readable storage medium and program instructions stored on at least one of the one or more tangible storage medium, the program instructions executable by a processor, the program instructions comprising:
        program instructions to identify, by a processor, a plurality of unknown code points for a document in response to an indexing request for the document, wherein a code point is a numerical value that is assigned to a character within a codepage, wherein the codepage is a table of numerical values that defines a character set, wherein identifying the plurality of unknown code points for the document further includes:
            receiving, by the processor, the document, wherein the document includes one or more attachments;
            parsing, utilizing multiple codepages, each of the one or more attachments for the plurality of unknown code points, wherein the unknown code points are within at least one of the one or more attachments;
        program instructions to convert the identified plurality of unknown code points into a plurality of converted code points, wherein each of the plurality of converted code points uses a different codepage, wherein the converting the identified plurality of unknown code points into the plurality of converted code points further comprises:
            converting the identified plurality of unknown code points into a first set of converted code points with a first codepage; and
            converting the identified plurality of unknown code points into a second set of converted code points with a second codepage;
        program instructions to identify sets of same code points and sets of redundant code points from the plurality of converted code points; and
        program instructions to build an index based on the identified sets of same code points and the identified sets of redundant code points.

8. The computer program product of claim 7, further comprising:
    program instructions to retain the sets of same code points and the sets of redundant code points.

9. The computer program product of claim 8, wherein the retaining the sets of same code points further comprises:
    program instructions to retain a first set of same code points from the first set of converted code points; and
    program instructions to retain a second set of same code points from the second set of converted code points.

10. The computer program product of claim 7, further comprising:
    program instructions to assign a weight to the first set of converted code points and the second set of converted code points.

11. The computer program product of claim 10, wherein, in the built index, a redundant index is constructed from the first set of redundant code points and the second set of redundant code points, and is assigned with a same weight as the first set of converted code points and the second set of converted code points, further comprising:
    program instructions to present a plurality of documents as a search result list in response to a search request, wherein a position of a search result document in the search result list is based on redundant indexes used by the search result document.

* * * * *